US012602794B2

(12) United States Patent
Li et al.

(10) Patent No.: US 12,602,794 B2
(45) Date of Patent: Apr. 14, 2026

(54) METHOD AND UNIFIED FRAMEWORK SYSTEM FOR FULL-STACK AUTONOMOUS DRIVING PLANNING

(71) Applicant: Shanghai Artificial Intelligence Innovation Center, Shanghai (CN)

(72) Inventors: Hongyang Li, Shanghai (CN); Li Chen, Shanghai (CN); Jiazhi Yang, Shanghai (CN); Yihan Hu, Shanghai (CN); Chonghao Sima, Shanghai (CN); Tianyu Li, Shanghai (CN); Lewei Lu, Shanghai (CN); Yu Liu, Shanghai (CN); Qiang Liu, Shanghai (CN); Junchi Yan, Shanghai (CN); Dahua Lin, Shanghai (CN); Yu Qiao, Shanghai (CN); Xiaogang Wang, Shanghai (CN)

(73) Assignee: Shanghai Artificial Intelligence Innovation Center

( * ) Notice: Subject to any disclaimer, the term of this patent is extended or adjusted under 35 U.S.C. 154(b) by 327 days.

(21) Appl. No.: 18/306,516

(22) Filed: Apr. 25, 2023

(65) Prior Publication Data

US 2024/0193793 A1     Jun. 13, 2024

(30) Foreign Application Priority Data

Dec. 12, 2022   (CN) .......................... 202211599532.2

(51) Int. Cl.
    *G06T 7/246*        (2017.01)
    *B60W 60/00*        (2020.01)
        (Continued)
(52) U.S. Cl.
    CPC ................ *G06T 7/246* (2017.01); *G06T 7/11* (2017.01); *B60W 60/0027* (2020.02);
        (Continued)

(58) Field of Classification Search
    CPC ....... B60W 2420/403; B60W 2556/40; B60W 60/0027; G01C 21/3602; G01C 21/3811;
        (Continued)

(56) References Cited

U.S. PATENT DOCUMENTS

2021/0146963 A1*   5/2021   Li ............................. G06N 3/09
2021/0302992 A1*   9/2021   Chen .................... G05D 1/0088
            (Continued)

FOREIGN PATENT DOCUMENTS

CN         108944944 A        12/2018
CN         112249033 A        1/2021
CN         112644487 A        4/2021

*Primary Examiner* — Kenny A Cese
(74) *Attorney, Agent, or Firm* — Nitin Kaushik

(57)        ABSTRACT

The present application provides a method and a unified framework system for full-stack autonomous driving planning. The method comprises: acquiring an image of a scene and converting the image into an image feature, and converting the image feature into a bird's-eye view feature map; detecting agents from the bird's-eye view feature map through track query vectors, and continuously tracking the agents; segmenting different types of map elements from the bird's-eye view feature map through map query vectors, and continuously updating the map elements; predicting a future trajectory of each agent using an interaction between the agents and the different map elements; predicting, according to the predicted future trajectory of each agent, an occupancy grid map over multi-steps into the future; and decoding an ego-vehicle query vector to generate a planned path of an ego-vehicle, and optimizing the planned path using the predicted future multi-step occupancy grid map.

10 Claims, 5 Drawing Sheets

(51) Int. Cl.
  *G01C 21/00*    (2006.01)
  *G06T 7/11*    (2017.01)
(52) U.S. Cl.
  CPC ... *B60W 2420/403* (2013.01); *B60W 2556/40*
      (2020.02); *G01C 21/3811* (2020.08); *G06T*
        *2207/30241* (2013.01); *G06T 2207/30252*
                        (2013.01)
(58) Field of Classification Search
  CPC . G06T 2207/30241; G06T 2207/30252; G06T
        7/11; G06T 7/246; G06V 10/82; G06V
            20/58; G08G 1/166; Y02T 10/40
  USPC ......................................................... 382/103
  See application file for complete search history.

(56)            References Cited

U.S. PATENT DOCUMENTS

2023/0391374 A1 * 12/2023  Chen ...................... G06N 3/088
2024/0017745 A1 *  1/2024  Cao ................... B60W 50/0097

* cited by examiner (a)

(b)

(c)

(d)

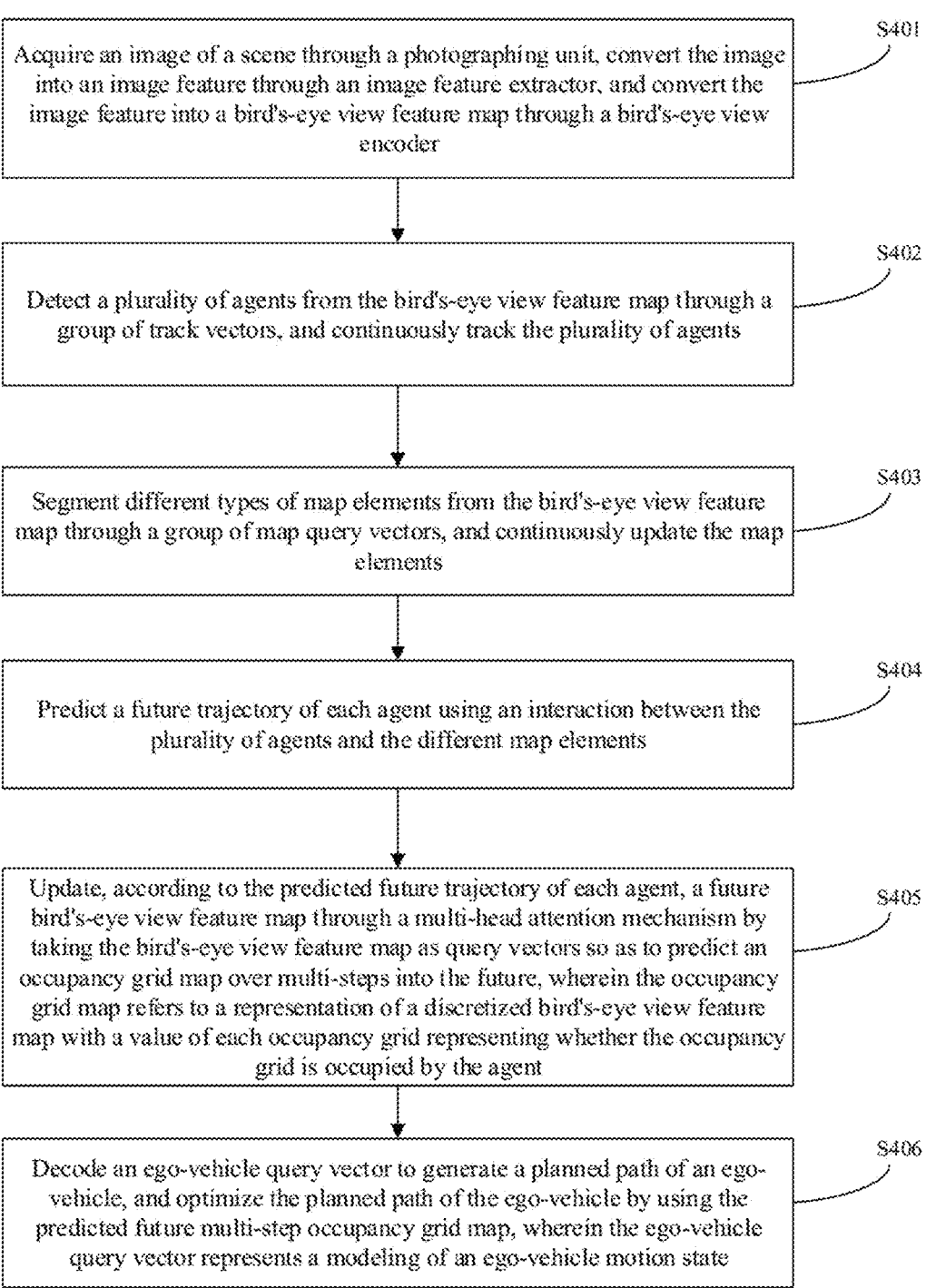

S401

Acquire an image of a scene through a photographing unit, convert the image into an image feature through an image feature extractor, and convert the image feature into a bird's-eye view feature map through a bird's-eye view encoder

S402

Detect a plurality of agents from the bird's-eye view feature map through a group of track vectors, and continuously track the plurality of agents

S403

Segment different types of map elements from the bird's-eye view feature map through a group of map query vectors, and continuously update the map elements

S404

Predict a future trajectory of each agent using an interaction between the plurality of agents and the different map elements

S405

Update, according to the predicted future trajectory of each agent, a future bird's-eye view feature map through a multi-head attention mechanism by taking the bird's-eye view feature map as query vectors so as to predict an occupancy grid map over multi-steps into the future, wherein the occupancy grid map refers to a representation of a discretized bird's-eye view feature map with a value of each occupancy grid representing whether the occupancy grid is occupied by the agent

S406

Decode an ego-vehicle query vector to generate a planned path of an ego-vehicle, and optimize the planned path of the ego-vehicle by using the predicted future multi-step occupancy grid map, wherein the ego-vehicle query vector represents a modeling of an ego-vehicle motion state

FIG. 4

METHOD AND UNIFIED FRAMEWORK SYSTEM FOR FULL-STACK AUTONOMOUS DRIVING PLANNING

CROSS-REFERENCE TO RELATED APPLICATIONS

The application claims priority to Chinese patent application No. 202211599532.2, filed on Dec. 12, 2022, the entire contents of which are incorporated herein by reference.

TECHNICAL FIELD

The present application relates to the technical field of electronics, and in particular to a method and a unified framework system for full-stack autonomous driving planning.

BACKGROUND

Modern autonomous driving systems include a plurality of tasks that are performed sequentially, namely perception, decision making and planning. A good autonomous driving system is required to take tasks as its ultimate goal, i.e., safe route planning; it is planning-oriented, analyzing and researching key components in perception and prediction, and establishing the components according to a certain priority, such that all subtasks are beneficial to planning. With the advance of sensors and hardware, it is a trend to design a system that can perform various tasks to achieve higher levels of intelligence. Existing design solutions can be generalized into two categories: 1) deploying an independent model for each task; and 2) establishing a multi-task learning model comprising a plurality of independent task heads. However, these methods may be subject to cumulative errors or negative migration effects.

Among the design solutions commonly used in the prior art, the design solution of the independent model as shown in FIG. 1(a) is to deploy an independent model for each task, which simplifies the design of the multi-task model. However, due to the difference of optimization objectives of different subtasks, such design is exposed to the risks of information loss, error accumulation and feature misalignment. Another design is a multi-task framework, which integrates different tasks into a multi-task learning (MTL) paradigm, as shown in FIG. 1(b), for example, the designs of manufacturers such as Mobileye, Tesla, and Nvidia. In MTL, the multi-task cooperative training utilizes the same feature extractor, such that multi-subtasks can be conveniently expanded and the computation of chips is saved. However, such a method still does not solve the problem of inconsistent optimization directions of different tasks, and meanwhile, supervision information of different tasks is not sufficiently interacted.

In response to the shortcomings of the above solutions, an end-to-end autonomous driving design solution as shown in FIGS. 1(c) and 1(d) has also emerged in the prior art, wherein the end-to-end autonomous driving framework combines perception, decision making and planning into a whole other than multiple independent subtasks. As shown in FIG. 1(e), a solution of directly planning from a perception result is adopted, and as shown in FIG. 1(d), a solution of cascading a plurality of modules is adopted. However, in the design solutions shown in FIGS. 1(c) and 1(d), the selection and priority of the preamble tasks (modules) are not planned. Although the planning result can be directly optimized to train the network, the advantages of upstream tasks in planning are not fully explored, so that the problem of error accumulation inevitably occurs, and the tasks cannot be prioritized in a hierarchical manner in order to achieve a better planning result.

SUMMARY

The present application is intended to solve one of the above problems, and provides a unified autonomous driving framework (UniAD) in which full-stack driving tasks are integrated into a deep neural network, and the advantages of all of subtasks and modules can be exerted to perform a safety planning for autonomous driving.

A primary objective of the present application is to provide a full-stack autonomous driving planning method.

Another objective of the present application is to provide a unified framework system for full-stack autonomous driving planning.

In order to achieve the above objectives, the technical solutions of the present application are as follows:

In an aspect, the present application provides a full-stack autonomous driving planning method, which comprises the following steps: acquiring an image of a scene through a photographing unit, converting the image into an image feature through an image feature extractor, and converting the image feature into a bird's-eye view feature map through a bird's-eye view encoder; detecting a plurality of agents from the bird's-eye view feature map through a group of track query vectors, and continuously tracking the plurality of agents; segmenting different types of map elements from the bird's-eye view feature map through a group of map query vectors, and continuously updating the map elements; predicting a future trajectory of each agent using an interaction between the plurality of agents and the different map elements; updating, according to the predicted future trajectory of each agent, a future bird's-eye view feature map through a multi-head attention mechanism by taking the bird's-eye view feature map as query vectors so as to predict an occupancy grid map over multi-steps into the future, wherein the occupancy grid map refers to a representation of a discretized bird's-eye view feature map with a value of each occupancy grid representing whether the occupancy grid is occupied by the agent; and decoding an ego-vehicle query vector to generate a planned path of an ego-vehicle, and optimizing the planned path of the ego-vehicle by using the predicted future multi-step occupancy grid map, wherein the ego-vehicle query vector represents a modeling of an ego-vehicle motion state.

In another aspect, the present application provides a unified framework system for full-stack autonomous driving planning, which comprises: an acquisition module, configured for acquiring an image of a scene through a photographing unit, converting the image into an image feature through an image feature extractor, and converting the image feature into a bird's-eye view feature map through a bird's-eye view encoder; a tracking module, configured for detecting a plurality of agents from the bird's-eye view feature map through a group of track query vectors, and continuously tracking the plurality of agents; a map module, configured for segmenting different types of map elements from the bird's-eye view feature map through a group of map query vectors, and continuously updating the map elements: a motion forecasting module, configured for forecasting a future trajectory of each agent using an interaction between the plurality of agents and the different map elements; an occupancy prediction module, configured for updating, according to the predicted future trajectory of each agent, a future bird's-eye view feature map through a multi-head attention mechanism by taking the bird's-eye view feature map as query vectors so as to predict an occupancy grid map over multi-steps into the future, wherein the occupancy grid map refers to a representation of a discretized bird's-eye view feature map with a value of each occupancy grid representing whether the occupancy grid is occupied by the agent; and a planning module, configured for decoding an ego-vehicle query vector to generate a planned path of an ego-vehicle, and optimizing the planned path of the ego-vehicle by using the predicted future multi-step occupancy grid map, wherein the ego-vehicle query vector represents a modeling of an ego-vehicle motion state.

According to the technical solutions provided in the present application, the present application provides a method and a unified framework system for full-stack autonomous driving planning. The system is planning-oriented, which designs a hierarchical integrated framework composed of modules such as perception, prediction and decision making, can perform tasks such as tracking, mapping, motion forecasting, occupancy prediction and planning at high precision, connects all modules of the framework through unified query vectors, fully establishes a complex interaction between agents and the environment, continuously extracts motion information of the agents, applies the results of upstream tasks of the modules to driving planning, and finally achieves the safety planning of an autonomous driving path.

BRIEF DESCRIPTION OF THE DRAWINGS

In order to more clearly explain the technical solutions in the embodiments of the present application, the following will briefly introduce the drawings needed in the description of the embodiments. Obviously, the drawings in the following description are only some embodiments of the present application. For those of ordinary skill in the art, other drawings can be obtained according to these drawings without any creative effort.

FIG. 4 is a flowchart of a full-stack autonomous driving planning method according to Embodiment 1 of the present application.

DETAILED DESCRIPTION

Figure 1:
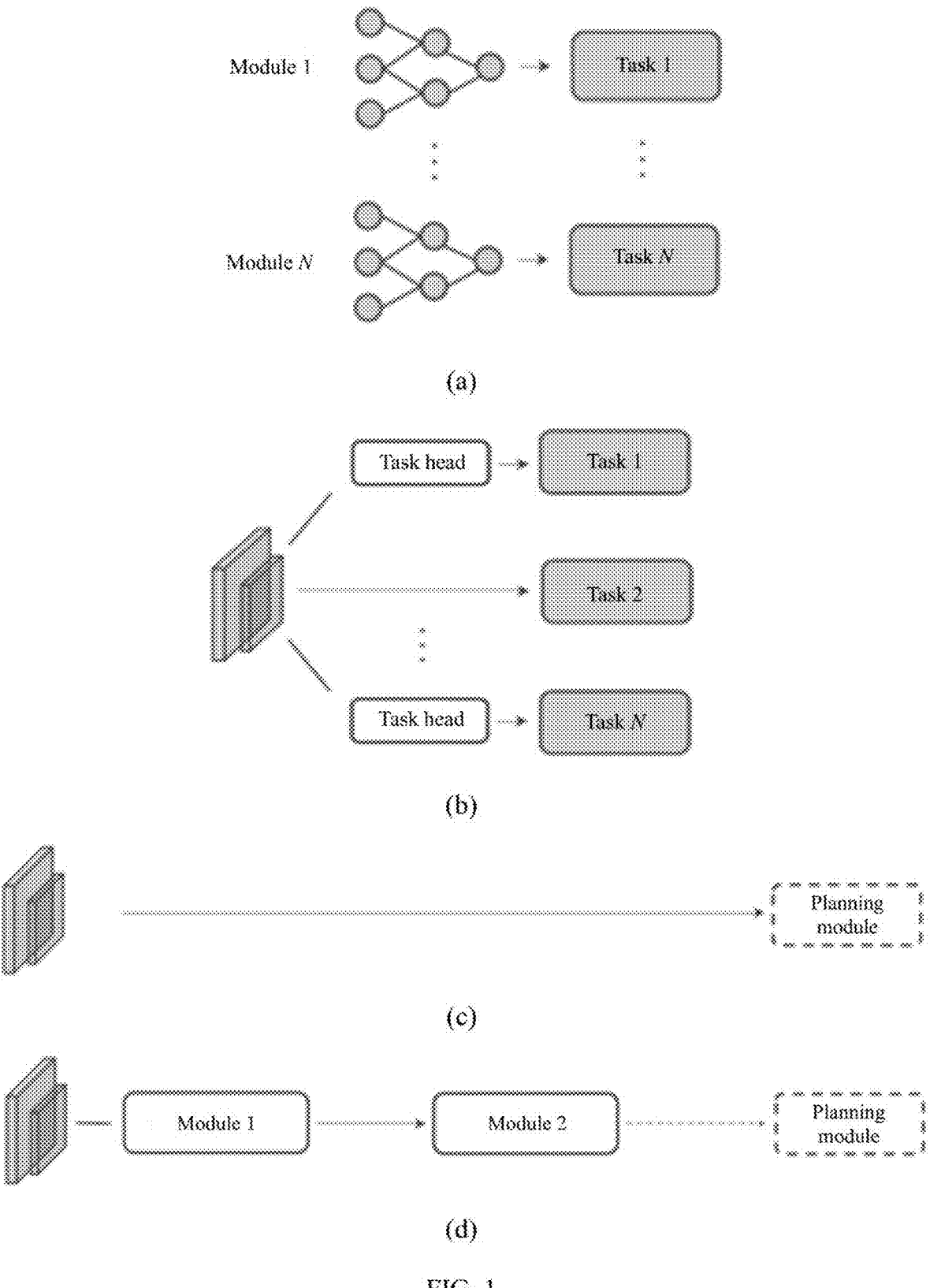
FIG. 1 is a schematic diagram of a framework method in the prior art according to Embodiment 1 of the present application.

The technical solutions in embodiments of the present application will be described clearly and completely with reference to the drawings in the embodiments of the present application, and it is obvious that the described embodiments are merely some embodiments of the present application, and not all embodiments. All other embodiments acquired by those of ordinary skilled in the art based on the embodiments in the present application without making any creative labor fall within the protection scope of the present application.

In the description of the present application, it should be understood that the terms "center", "longitudinal", "lateral", "upper", "lower". "front". "rear", "left", "right", "vertical", "horizontal", "top", "bottom", "inner", "outer", and the like indicate orientations or location relationships based on those shown in the drawings, which is merely for the convenience of describing the present application and simplifying the description, rather than indicating or implying that the apparatus or element referred to must have a specific orientation, be constructed and operate in the specific orientation, so it cannot be understood as a limitation to the present application. Furthermore, the terms "first" and "second" are used for descriptive purposes only and should not be construed as indicating or implying relative importance or quantity or location.

In the description of the present application, it should be noted that, unless otherwise clearly specified or defined, the terms "mount", "interconnect" and "connect" should be understood in their broad sense. For example, "connect" may be "fixedly connect", "detachably connect" or "integrally connect"; "mechanically connect" and "electrically connect"; or "directly interconnect", "indirectly interconnect through an intermediate" or "the communication between the interiors of two elements". For those of ordinary skill in the art, the specific meanings of the aforementioned terms in the present application can be understood according to specific conditions.

The embodiments of the present application will be described with reference to the accompanying drawings in more detail.

Embodiment 1

The present embodiment provides a unified framework system for full-stack autonomous driving planning, which is also referred to as a unified autonomous driving framework (UniAD) in the present embodiment, in which full-stack driving tasks can be integrated into a deep neural network, and the advantages of all of subtasks and modules can be exerted to perform a safety planning. Thus, the UniAD is an autonomous driving framework that combines full-stack driving tasks and aims at safety planning, in which more subtasks can be performed to better model the road environment and avoid obstacles, where the tasks include detection, tracking, mapping, motion forecasting, and occupancy prediction, and which a safe planning is finally performed.

Figure 2:
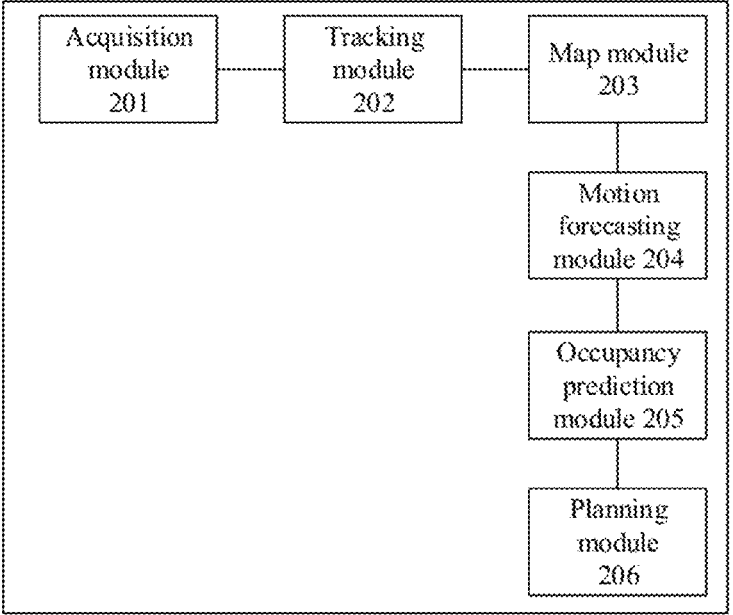
FIG. 2 is a schematic structural diagram of a unified framework system for full-stack autonomous driving planning according to Embodiment 1 of the present application.
Figure 3:
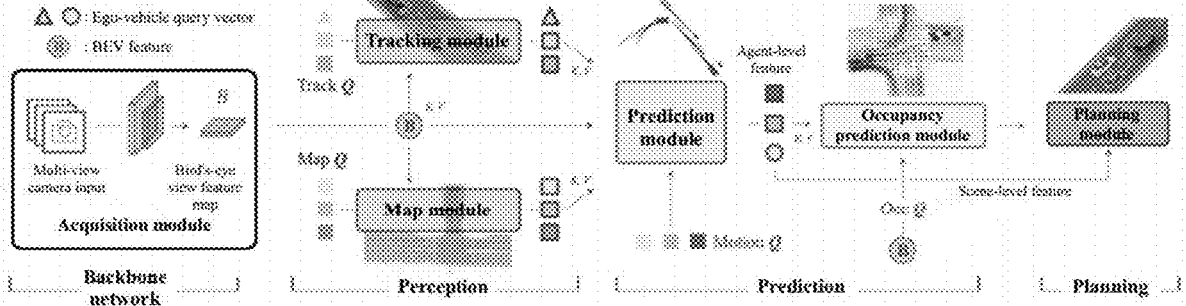
FIG. 3 is a specific block diagram of the unified framework system for full-stack autonomous driving planning according to Embodiment 1 of the present application.

FIG. 2 is a schematic structural diagram of a unified framework system for full-stack autonomous driving planning according to the present embodiment, and FIG. 3 is a specific block diagram of the unified framework system for full-stack autonomous driving planning according to the present embodiment. As shown in FIG. 2, the unified framework system for full-stack autonomous driving planning of the present embodiment specifically includes the following functional modules:

Included is an acquisition module 201 configured for acquiring an image of a scene, converting the image into an image feature through an image feature extractor, and converting the image feature into a bird's-eye view feature map through a bird's-eye view encoder. Specifically, the acquisition module 201 comprises a photographing unit through which a video or an image of a scene can be acquired, the photographing unit being capable of employing a plurality of panoramic cameras. The videos or image information acquired by the cameras are converted into image features through the image feature extractor, and then the image features are converted into bird's-eye view (BEV) features through a BEV encoder, so as to form a BEV feature map.

Included is a tracking module 202 configured for detecting a plurality of agents from the bird's-eye view feature map through a group of track query vectors, and continuously tracking the plurality of agents. Specifically, agents are generally equivalent to objects, including objects that can move or cannot move, and in the present application, the agents are synonymous with an object. Newly emerging objects (agents) are detected from the BEV features by using a group of track query vectors (abbreviated as Track Q) and objects that have been detected are continuously tracked. The tracking module 202 (TrackFormer) can perform detection and multi-target tracking simultaneously, wherein a group of track query vectors (Track Q) are introduced to model the entire life cycle (i.e., the whole process from appearance to complete disappearance) of a tracked object in the scene. The track query vectors (Track Q), together with the BEV features, are computed through the multi-head cross-attention mechanism and are decoded through a multi-layer perceptron (MLP) to finally obtain attributes such as a bounding box and a speed of the tracked object.

In an alternative embodiment, keys and values of the track query vectors are a bird's-eye view feature map; continuously tracking the plurality of agents comprises: updating the key and the value of each track query vector through the multi-head cross-attention mechanism. Specifically, the multi-head cross-attention mechanism is to calculate the similarity between Q and K by inputting a vector Q, a key K and a value V, and output V in a weighted manner (which may also be regarded as updating Q). "Multi-head" means that the process may cover a plurality of parallel modules of the same structure to achieve full interaction between Q, K and V.

In the present embodiment, each group of vectors correspond to a separate group of initialization values, and each group of vectors will learn different features as the loss function of the corresponding task is optimized. For example, if a tracking frame is optimized, the track query vectors will gradually learn to find features from the bird's-eye view feature map that are similar to those of the tracked object. Since each vector Q has a different task, even if the key K and value V of Q employ the same element, the final result will be different for different vectors Q after successive updates. It can be seen that each group of vectors can gradually learn the elements required for the corresponding tasks during the optimization process.

Included is a map module 203 configured for segmenting different types of map elements from the bird's-eye view feature map through a group of map query vectors, and continuously updating the map elements. Specifically, the map module 203 (MapFormer) can be used for online mapping by migrating a segmentation solution for a 2D panorama into a 3D scene. Different types of map elements existing in a scene are segmented by map query vectors (abbreviated as Map Q), such as, lane lines, pedestrian lines, zebra crossings, demarcations, and drivable areas. These map elements will facilitate the learning of the ambient information by the downstream task modules. The map query vectors (Map Q), after being updated, are transmitted to a motion forecasting module 204 for interaction between the objects and the map elements.

In an alternative embodiment, keys and values of the map query vectors are a bird's-eye view feature map; continuously updating the map elements comprises: updating the key and the value of each map query vector through a multi-head cross-attention mechanism. Specifically, the map module 203 can also update the vectors by using the multi-head cross-attention mechanism described above, such that the map query vectors can learn the elements required for the corresponding tasks in the optimization process according to the corresponding map tasks.

Included is a motion forecasting module 204 configured for forecasting a future trajectory of each agent using an interaction between the plurality of agents and the different map elements. Specifically, the motion forecasting module 204 forecasts the future trajectory of each object by modeling the interaction between the object and the environment. The motion forecasting module 204 (MotionFormer) takes the information-rich object features and map features as inputs, and outputs future trajectories of all the agents with multiple modalities in the scene. The paradigm only needs one forward network propagation to output the future trajectories of all the agents, and compared with the prior method taking the agents as the center, the computational cost of aligning the coordinate space in each step is saved.

The motion forecasting module 204 (MotionFormer) may be composed of multiple layers of cross-attention modules to achieve the goal of continuous refinement. Each layer of module contains three different attention computations to model different types of interactions, and trajectory query vectors (Motion Q) obtained from the multiple interactions are continuously transmitted to the occupancy prediction module 205. The three interactions are present between an agent and an agent, an agent and a map, and an agent and a trajectory end point respectively, and are represented as follows:

$$Q_{a/m} = MHCA(MHSA(Q), Q_A / Q_M),$$

$$Q_g = DeformAttn(Q, \hat{x}_T^{l-1}, B),$$

where MHCA represents multi-head cross-attention, MHSA represents multi-head self-attention, DeformAttn represents deformable attention, Q represents a trajectory query vector, $Q_A$ represents an agent feature from the tracking module, $Q_M$ represents a map feature from the map module. $Q_{a/m}$ represents a trajectory feature after the interaction between track query vectors Q, $Q_A$ and $Q_M$, B represents a bird's-eye view feature map, $$\hat{x}_T^{l-1}$$

represents an output of the previous layer of motion forecasting module, and $Q_g$ represents a trajectory feature after the interaction between the trajectory query vector Q and the trajectory end point.

Included is an occupancy prediction module 205 configured for updating, according to the predicted future trajectory of each agent, a future bird's-eye view feature map through a multi-bead attention mechanism by taking the bird's-eye view feature map as query vectors so as to predict an occupancy grid map over multi-steps into the future, wherein the occupancy grid map refers to a representation of a discretized bird's-eye view feature map with a value of each occupancy grid representing whether the occupancy grid is occupied by the agent. Specifically, the occupancy grid map is a discretized BEV representation in which the value represented by each grid represents whether the current location is occupied by an object (0 for absence, 1 for occupancy). The task of the occupancy prediction module 205 is to predict the occupancy grid map over multi-steps into the future, i.e., the occupancy of future BEV. In the prior art, a convolutional neural network (CNN) and a recurrent neural network (RNN) are generally used for step-by-step multi-step prediction and decoding of future BEV feature maps. However, motion information of objects in a scene is ignored, which is strongly associated with occupancy grids of a future scene. To introduce sparse motion information of objects, in the present embodiment, a multi-head cross-attention mechanism is utilized in the occupancy prediction module 205, where dense grids in the scene are represented as query vectors Q, and object features are represented as keys K and values V. The query vectors will be updated multiple times through multi-layer decoders and are defined to represent the future timing. To enhance the location alignment between objects and grids, the present embodiment further introduces an attention mask which enables the attention computation to be performed only between the grids and the object features with the grids corresponding to the objects. The update formula for the query vector may be as follows:

$$D_{ds}^t = MHCA(MHSA(F_{ds}^t), G^t, \text{attn\_mask} = O_m^t).$$

where MHCA represents multi-head cross-attention, MHSA represents multi-head self-attention, $G^t$ represents an object feature at moment t, $$F_{ds}^t$$

represents an occupancy grid map at moment t, and $$D_{ds}^t$$

represents an occupancy grid map obtained after the interaction; attn_mask represents an attention mask (part of the attention computation is masked such that the attention computation is performed only on the areas occupied by the objects with reduced computation of the background section), and $$O_m^t$$

represents an occupancy grid preliminarily predicted by the model and is taken as the attention mask in the formula.

Included is a planning module 206 configured for decoding an ego-vehicle query vector to generate a planned path of an ego-vehicle, and optimizing the planned path of the ego-vehicle by using the predicted future multi-step occupancy grid map, wherein the ego-vehicle query vector represents a modeling of an ego-vehicle motion state. Specifically, the planning module 206 (Planner) decodes the ego-vehicle query vector to generate a planned path, and optimizes the path through the occupancy prediction to avoid obstacles. The ego-vehicle query vector is preliminarily modeled in the tracking module 202 and then further optimized in the motion forecasting module 204. To continuously model the ego-vehicle motion information (the ego-vehicle is the subject vehicle implementing the present application), the future trajectory of the ego-vehicle can be learned by using the ego-vehicle query vector (Sdc query) in the tracking module 202. To plan the future motion of the ego-vehicle, the updated ego-vehicle query vector in the motion forecasting module 204 and BEV features are computed through the multi-head cross-attention mechanism, such that the ego-vehicle query vector perceives the whole BEV environment, implicitly learns the surrounding environment, and avoids collision. To more explicitly avoid collisions with surrounding vehicles, the path of the ego-vehicle is optimized by using the outputs of the occupancy prediction module to avoid areas that may be occupied in the future.

The unified framework system for full-stack autonomous driving planning provided in the present embodiment is planning-oriented, which designs a hierarchical integrated framework composed of modules such as perception, prediction and decision making, can perform tasks such as tracking, mapping, motion forecasting, occupancy prediction and planning at high precision, connects all modules of the framework through a unified query vector, fully establishes a complex interaction between agents and the environment, continuously extracts motion information of the agents, applies the results of upstream tasks of the modules to driving planning, and finally achieves the safety planning of an autonomous driving path.

In an alternative embodiment, the training for the UniAD of the present application can be performed in two stages, wherein the training tracking and mapping modules are combined at the first stage, and all the perception, prediction, and planning modules are trained end-to-end at the second stage. The two-stage training mode is adopted to acquire good perceptual performance at the first stage, so as to help the convergence of downstream tasks at the second stage.

The present embodiment provides a full-stack autonomous driving planning method, as shown in FIG. 4, which comprises the following steps:

In step S401, an image of a scene is acquired through a photographing unit, the image is converted into an image feature through an image feature extractor, and the image feature is converted into a bird's-eye view feature map through a bird's-eye view encoder. Specifically, a video or an image of a scene can be acquired through the photographing unit being capable of employing a plurality of panoramic cameras. The videos or image information acquired by the cameras are converted into image features through the image feature extractor, and then the image features are converted into bird's-eye view (BEV) features through a BEV encoder, so as to form a BEV feature map.

In step S402, a plurality of agents are detected from the bird's-eye view feature map through a group of track query vectors, and the plurality of agents are continuously tracked. Specifically, agents are generally equivalent to objects, including objects that can move or cannot move, and in the present application, the agents are synonymous with an object. Newly emerging objects (agents) are detected from the BEV features by using a group of track query vectors (abbreviated as Track Q) and objects that have been detected are continuously tracked. The detection and multi-target tracking can be performed simultaneously, wherein a group of track query vectors (Track Q) are introduced to model the entire life cycle (i.e., the whole process from appearance to complete disappearance) of a tracked object in the scene, the track query vectors (Track Q), together with the BEV features, are computed through the multi-head cross-attention mechanism and are decoded through a multi-layer perceptron (MLP) to finally obtain attributes such as a bounding box and a speed of the tracked object.

In an alternative embodiment, keys and values of the track query vectors are a bird's-eye view feature map; continuously tracking the plurality of agents comprises: updating the key and the value of each track query vector through the multi-head cross-attention mechanism. Specifically, the multi-head cross-attention mechanism is to calculate the similarity between Q and K by inputting a vector Q, a key K and a value V, and output V in a weighted manner (which may also be regarded as updating Q). "Multi-head" means that the process may cover a plurality of parallel modules of the same structure to achieve full interaction between Q, K and V.

In the present embodiment, each group of vectors correspond to a separate group of initialization values, and each group of vectors will learn different features as the loss function of the corresponding task is optimized. For example, if a tracking frame is optimized, the track query vectors will gradually learn to find features from the bird's-eye view feature map that are similar to those of the tracked object. Since each vector Q has a different task, even if the key K and value V of Q employ the same element, the final result will be different for different vectors Q after successive updates. It can be seen that each group of vectors can gradually learn the elements required for the corresponding tasks during the optimization process.

In step S403, different types of map elements are segmented from the bird's-eye view feature map through a group of map query vectors, and the map elements are continuously updated. Specifically, online mapping can be achieved by migrating a segmentation solution for a 2D panorama into a 3D scene. Different types of map elements existing in a scene are segmented by map query vectors (abbreviated as Map Q), such as, lane lines, pedestrian lines, zebra crossings, demarcations, and drivable areas. These map elements will facilitate the learning of the ambient information by the downstream task modules. The map query vectors (Map Q), after being updated, are transmitted to a motion forecasting module 204 for interaction between the objects and the map elements.

In an alternative embodiment, keys and values of the map query vectors are a bird's-eye view feature map; continuously updating the map elements comprises: updating the key and the value of each map query vector through a multi-head cross-attention mechanism. Specifically, the vectors are updated by using the multi-head cross-attention mechanism described above, such that the map query vectors can learn the elements required for the corresponding tasks in the optimization process according to the corresponding map tasks.

In step S404, a future trajectory of each agent is predicted using an interaction between the plurality of agents and the different map elements. Specifically, the future trajectory of each object can be predicted by modeling the interaction between the object and the environment. The information-rich object features and map features are taken as inputs, and future trajectories of all the agents with multiple modalities are output in the scene. The paradigm only needs one forward network propagation to output the future trajectories of all the agents, and compared with the prior method taking the agents as the center, the computational cost of aligning the coordinate space in each step is saved.

The step can be specifically performed through multiple layers of cross-attention modules to achieve the goal of continuous refinement. Each layer of module contains three different attention computations to model different types of interactions, and trajectory query vectors (Motion Q) obtained from the multiple interactions are continuously transmitted to the next step. The three interactions are present between an agent and an agent, an agent and a map, and an agent and a trajectory end point respectively, and are represented as follows:

$$Q_{a/m} = MHCA(MHSA(Q), Q_A / Q_M),$$

$$Q_g = DeformAttn(Q, \hat{x}_T^{l-1}, B),$$

where MHCA represents multi-head cross-attention, MHSA represents multi-head self-attention, DeformAttn represents deformable attention, Q represents a trajectory query vector, $Q_A$ represents an agent feature from the tracking module, $Q_M$ represents a map feature from the map module. $Q_{a/m}$ represents a trajectory feature after the interaction between track query vectors Q, $Q_A$ and $Q_M$, B represents a bird's-eye view feature map, $$\hat{x}_T^{l-1}$$

represents an output of the previous layer of motion forecasting module, and $Q_g$ represents a trajectory feature after the interaction between the trajectory query vector Q and the trajectory end point.

In step S405, according to the predicted future trajectory of each agent, a future bird's-eye view feature map is updated through a multi-head attention mechanism by taking the bird's-eye view feature map as query vectors so as to predict an occupancy grid map over multi-steps into the future, wherein the occupancy grid map refers to a representation of a discretized bird's-eye view feature map with a value of each occupancy grid representing whether the occupancy grid is occupied by the agent. Specifically, the occupancy grid map is a discretized BEV representation in which the value represented by each grid represents whether the current location is occupied by an object (0 for absence, 1 for occupancy). The task of occupancy prediction is to predict the occupancy grid map over multi-steps into the future, i.e., the occupancy of future BEV. In the prior art, a convolutional neural network (CNN) and a recurrent neural network (RNN) are generally used for step-by-step multi-step prediction and decoding of future BEV feature maps. However, motion information of objects in a scene is ignored, which is strongly associated with occupancy grids of a future scene. To introduce sparse motion information of objects, in the present embodiment, a multi-head cross-attention mechanism is utilized in the occupancy prediction module 205, where dense grids in the scene are represented as query vectors Q, and object features are represented as keys K and values V. The query vectors will be updated multiple times through multi-layer decoders and are defined to represent the future timing. To enhance the location alignment between objects and grids, the present embodiment further introduces an attention mask which enables the attention computation to be performed only between the grids and the object features with the grids corresponding to the objects. The update formula for the query vector may be as follows:

$$D_{ds}^t = MHCA(MHSA(F_{ds}^t), G^t, \text{attn\_mask} = O_m^t).$$

where MHCA represents multi-head cross-attention, MHSA represents multi-head self-attention, $G^t$ represents an object feature at moment t, $$F_{ds}^t$$

represents an occupancy grid map at moment t, and $$D_{ds}^t$$

represents an occupancy grid map obtained after the interaction; attn_mask represents an attention mask (part of the attention computation is masked such that the attention computation is performed only on the areas occupied by the objects with reduced computation of the background section), and $$O_m^t$$

represents an occupancy grid preliminarily predicted by the model and is taken as the attention mask in the formula.

In step S406, an ego-vehicle query vector is decoded to generate a planned path of an ego-vehicle, and the planned path of the ego-vehicle is optimized by using the predicted future multi-step occupancy grid map, wherein the ego-vehicle query vector represents a modeling of an ego-vehicle motion state. Specifically, in the step, the ego-vehicle query vector is decoded to generate a planned path, and the path is optimized through the occupancy prediction to avoid obstacles. The ego-vehicle query vector is preliminarily modeled in step 402 and further optimized in step 404. To continuously model the ego-vehicle motion information (the ego-vehicle is the subject vehicle implementing the present application), the future trajectory of the ego-vehicle can be learned by using the ego-vehicle query vector (Sde query) in step 402. To plan the future motion of the ego-vehicle, the updated ego-vehicle query vector in step 404 and BEV features are computed through the multi-head cross-attention mechanism, such that the ego-vehicle query vector perceives the whole BEV environment, implicitly learns the surrounding environment, and avoids collision. To more explicitly avoid collisions with surrounding vehicles, the path of the ego-vehicle is optimized by using the outputs of the occupancy prediction module to avoid areas that may be occupied in the future.

The unified framework system for full-stack autonomous driving planning provided in the present embodiment is planning-oriented, which designs a hierarchical integrated framework composed of modules such as perception, prediction and decision making, can perform tasks such as tracking, mapping, motion forecasting, occupancy prediction and planning at high precision, connects all modules of the framework through a unified query vector, fully establishes a complex interaction between agents and the environment, continuously extracts motion information of the agents, applies the results of upstream tasks of the modules to driving planning, and finally achieves the safety planning of an autonomous driving path.

To further demonstrate the advantages of the present application compared to other frameworks, the following is presented by three aspects of data including perception results, prediction results and planning results.

The data for the perception results are mainly presented in Table 1 and Table 2. Table 1 lists the comparison of the UniAD framework of the present application and other framework methods (Immortal Tracker, ViP3D, QD3 DT and MUTR3D) in terms of tracking performance. The AMOTA, AMOTP, RECALL and IDS are four indexes for measuring the tracking results, where an upward arrow indicates that a higher index is better and a downward arrow indicates that a lower index is better. For the multi-target tracking performance in Table 1, compared with the MUTR3D method and the ViP3D method, the UniAD has a significant improvement on the AMOTA index by +6.5% and +14.2%, respectively. Furthermore, the UniAD acquires the best IDS score (lower is better) on the IDS index, showing the temporal consistency of the UniAD in object tracking.

TABLE 1

| Comparison of UniAD on tracking performance | | | | |
|---|---|---|---|---|
| Framework method | AMOTA↑ | AMOTP↓ | Recall↑ | IDS↓ |
| Immortal Tracker | 0.378 | 1.119 | 0.478 | 936 |
| ViP3D | 0.217 | 1.625 | 0.363 | — |
| QD3DT | 0.242 | 1.518 | 0.399 | — |
| MUTR3D | 0.294 | 1.498 | 0.427 | 3822 |
| UniAD | 0.359 | 1.320 | 0.467 | 906 |

Table 2 lists the comparison of the UniAD framework of the present application and other framework methods (VPN, LSS, BEVFormer and BEVerse) in terms of map performance, where the lane lines, drivable areas, demarcations and zebra crossings are four categories of the map segmentation respectively, indexes of the four segmentation categories are measured by IoU, with a higher number of points is better. For the online map of Table 2, the UniAD shows excellent road element segmentation capability, with the significant increase in the column of "lane lines", increased by +7.4 IoU (%) compared with the BEVFormer method.

TABLE 2

| Comparison of UniAD on map performance | | | | |
|---|---|---|---|---|
| Framework method | Lane lines ↑ | Drivable areas ↑ | Demarcations ↑ | Zebra crossings ↑ |
| VPN | 18.0 | 76.0 | — | — |
| LSS | 18.3 | 73.9 | — | — |
| BEVFormer | 23.9 | 77.5 | — | — |

TABLE 2-continued

| Framework method | Lane lines ↑ | Drivable areas ↑ | Demarcations ↑ | Zebra crossings ↑ |
|---|---|---|---|---|
| | | Comparison of UniAD on map performance | | |
| BEVerse | — | — | 30.6 | 17.2 |
| UniAD | 31.3 | 69.1 | 25.7 | 13.8 |

The data for the predicted results are mainly presented in Table 3 and Table 4. Table 3 shows the comparison of the UniAD of the present application and other framework methods (PnPNet, ViP3D, Constant Pos. and Constant Vel.) in terms of the motion forecasting performance. As shown in Table 3, compared with PnPNet and ViP3D, the UniAD is significantly better than the previous camera-based end-to-end method and reduces the error rate by 38.3% and 65.4% on minADE, respectively.

TABLE 3

| Framework method | minADE(m)↓ | minFDE(m)↓ | MR↓ | EPA↓ |
|---|---|---|---|---|
| | Comparison of UniAD on motion forecasting performance | | | |
| PnPNet | 1.15 | 1.95 | 0.226 | 0.222 |
| ViP3D | 2.05 | 2.84 | 0.246 | 0.226 |
| Constant Pos. | 5.80 | 10.27 | 0.347 | — |
| Constant Vel. | 2.13 | 4.01 | 0.318 | — |
| UniAD | 0.71 | 1.02 | 0.151 | 0.456 |

Table 4 shows the comparison of the UniAD of the present application and other framework methods (FIERY, StretchBEV, ST-P3 and BEVerse) in terms of the occupancy prediction performance. For the occupancy prediction task performance shown in Table 4, the UniAD makes a significant improvement in nearby areas, and compared with the FIERY and BEVerse methods, the UniAD makes a significant increase of 4.0 and 2.0 in IoU-n. (%), respectively.

TABLE 4

| Framework method | IoU-n.↑ | Iou-f.↑ | VPQ-n.↑ | VPQ-f.↑ |
|---|---|---|---|---|
| | Comparison of UniAD on occupancy prediction performance | | | |
| FIERY | 59.4 | 36.7 | 50.2 | 29.9 |
| StretchBEV | 55.5 | 37.1 | 46.0 | 29.0 |
| ST-P3 | — | 38.9 | — | 32.1 |
| BEVerse | 61.4 | 40.9 | 54.3 | 36.1 |
| UniAD | 63.4 | 40.2 | 54.7 | 33.5 |

Table 5 shows the comparison of the UniAD of the present application and other framework methods (NMP, SA-NMP, FF, EO and ST-P3) in terms of planning performance. As can be seen from Table 5, the UniAD reduces the planned L2 error rate and collision rate by 51.2% and 56.3% compared with the ST-P3 method. Furthermore, the UniAD outperforms other LIDAR-based input methods (e.g., NMP, SA-NMP, FF and EO methods in the table).

TABLE 5

| Framework | L2(m)↓ | | | | Col. Rate(%)↓ | | | |
|---|---|---|---|---|---|---|---|---|
| | Comparison of UniAD on planning performance | | | | | | | |
| method | 1 s | 2 s | 3 s | Avg. | 1 s | 2 s | 3 s | Avg. |
| NMP | — | — | 2.31 | — | — | — | 1.92 | — |
| SA-NMP | — | — | 2.05 | — | — | — | 1.59 | — |

TABLE 5-continued

| Framework | L2(m)↓ | | | | Col. Rate(%)↓ | | | |
|---|---|---|---|---|---|---|---|---|
| | Comparison of UniAD on planning performance | | | | | | | |
| method | 1 s | 2 s | 3 s | Avg. | 1 s | 2 s | 3 s | Avg. |
| FF | 0.55 | 1.20 | 2.54 | 1.43 | 0.06 | 0.17 | 1.07 | 0.43 |
| EO | 0.67 | 1.36 | 2.78 | 1.60 | 0.04 | 0.09 | 0.88 | 0.33 |
| ST-P3 | 1.33 | 2.11 | 2.90 | 2.11 | 0.23 | 0.62 | 1.27 | 0.71 |
| UniAD | 0.48 | 0.96 | 1.65 | 1.03 | 0.05 | 0.17 | 0.71 | 0.31 |

Figure 5:
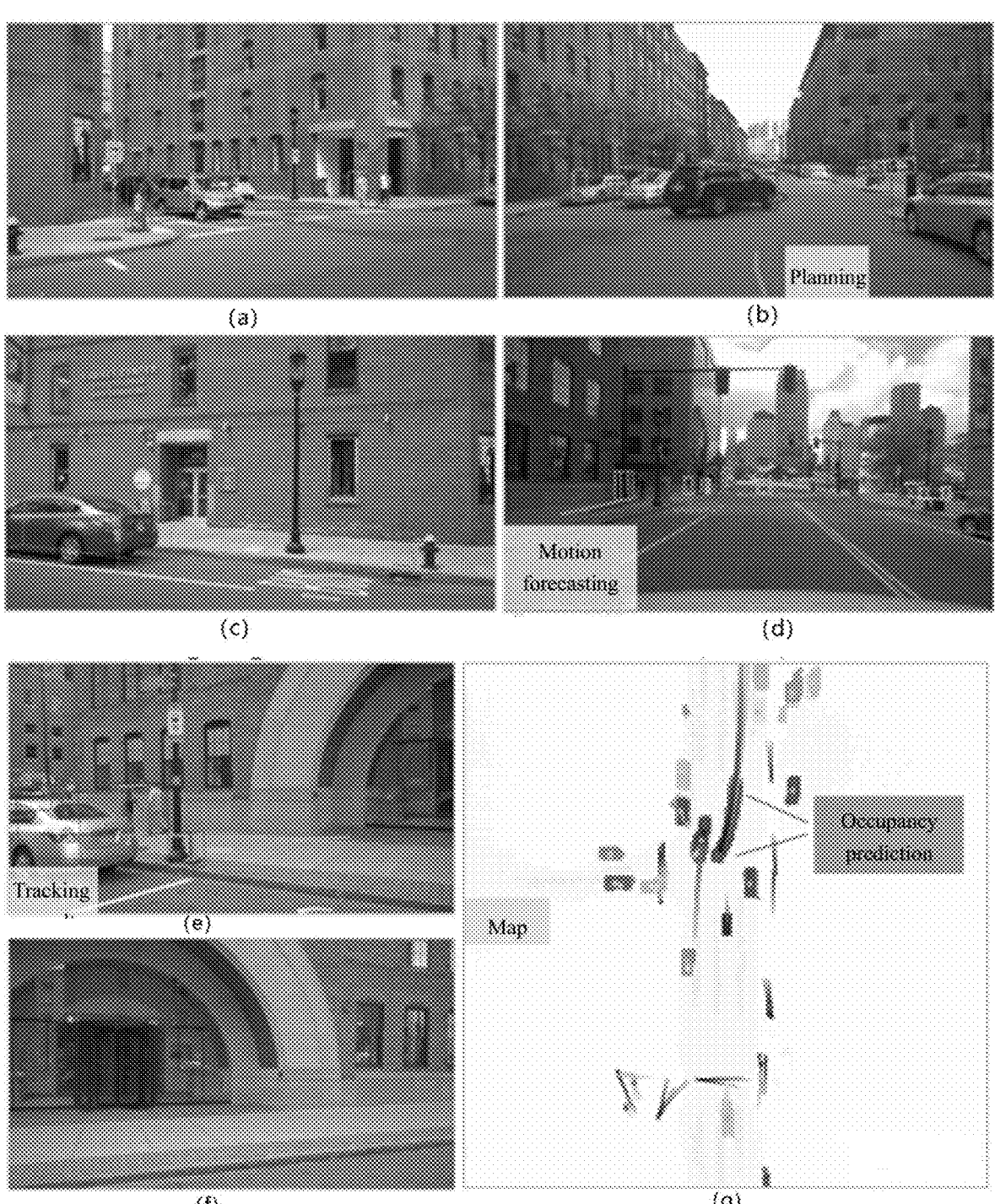
FIG. 5 is a diagram showing the comparison of the unified framework system according to Embodiment 1 of the present application and other framework methods in terms of planning performance.

FIG. 5 shows the advantage of the framework of the present application in planning results through visualization results. As shown in FIG. 5, FIGS. (a), (b), (c), (d), (e) and (f) respectively show the panoramic images captured by the cameras (left front/left rear/center front/center rear/right front/right rear) at six different locations on the ego-vehicle, and FIG. (g) is a BEV feature map. The prediction results of all tasks for the UniAD under two viewing angles are shown in the panoramic images ((a), (b), (c), (d), (e) and (f)) and the BEV feature map (FIG. (g)). Each box in the panoramic image is used to show an object, representing the tracking result of each different object by the model. The short line below the ground in the middle of the panoramic image (b) represents the future route planning by the ego-vehicle. The line on the left pedestrian line in the panoramic image (d) that extends from the pedestrian frame represents the future trajectory prediction of the object. In the FIG. (g), the current driving state of the ego-vehicle is a straight traveling state, and the modules and lines represent road surface segmentation results.

In addition, the results of ablation experiments also show the advantages of the framework of the present application. Table 6 lists the advantages of the various modules to the downstream tasks. The table shows the performance variation of the UniAD after the addition of different modules. The header of Table 6 indicates the name of different modules (tracking, map segmentation, motion forecasting, occupancy prediction (i.e., occupancy prediction), and planning), and indicates the evaluation indexes corresponding to each task, where an upward arrow indicates that a higher index is better and a downward arrow indicates that a lower index is better. The second column of Table 6 is the module corresponding column, showing which modules the experiment in each row contains (a ticked box corresponding to a module indicates that the current row has the module, and a non-ticked box corresponding to a module indicates that the current row does not have the module). For example, ID-5 (fifth row) is ticked only in the tracking module and the motion forecasting module, indicating that the current row only has the tracking module and the motion forecasting module. ID1-3 show the performance when only the tracking module and the map segmentation module are present. ID4-6 show the performance variation after the introduction of the motion forecasting module. ID7-9 show the performance variation after the introduction of the occupancy prediction module and the mutual influence of the motion forecasting task and the occupancy prediction task, and it can be seen that when ID-9 simultaneously contains the motion forecasting module and the occupancy prediction module, the indexes of the two tasks can be improved to the maximum extent, which indicates that the motion forecasting task and the occupancy prediction task are mutually reinforcing. ID10-12 show the performance variation after the introduction of the planning module. ID-12 containing all of the above task modules has the best planning performance, namely, a safer path is planned, thus illustrating the need for all modules.

It can be understood by those skilled in the art that all or part of the steps implementing the method of the above embodiments can be implemented by instructing relevant

TABLE 6

Advantages of various modules to downstream tasks

| | Module | | | | | Tracking | | | Map segmentation | |
|---|---|---|---|---|---|---|---|---|---|---|
| ID | Tracking | Map segmentation | Motion forecasting | Occupancy prediction | Planning | AMOTA↑ | AMOTP↓ | IDS↓ | IoU-lane↑ | IoU-road↑ |
| 0* | ✓ | ✓ | ✓ | ✓ | ✓ | 0.356 | 1.328 | 893 | 0.302 | 0.675 |
| 1 | | | | | | 0.348 | 1.333 | 791 | — | — |
| 2 | | ✓ | | | | — | — | — | 0.305 | 0.674 |
| 3 | ✓ | ✓ | | | | 0.355 | 1.336 | 785 | 0.301 | 0.671 |
| 4 | | | ✓ | | | — | — | — | — | — |
| 5 | ✓ | | ✓ | | | 0.360 | 1.350 | 919 | — | — |
| 6 | ✓ | ✓ | ✓ | | | 0.354 | 1.339 | 820 | 0.303 | 0.672 |
| 7 | | | | ✓ | | — | — | — | — | — |
| 8 | ✓ | | | ✓ | | 0.360 | 1.322 | 809 | — | — |
| 9 | ✓ | ✓ | ✓ | ✓ | | 0.359 | 1.359 | 1057 | 0.304 | 0.675 |
| 10 | | | | | ✓ | — | — | — | — | — |
| 11 | ✓ | ✓ | ✓ | | ✓ | 0.366 | 1.337 | 889 | 0.303 | 0.672 |
| 12 | ✓ | ✓ | ✓ | ✓ | ✓ | 0.358 | 1.334 | 641 | 0.302 | 0.672 |

| | Motion forecasting | | | Occupancy prediction | | | | Planning | |
|---|---|---|---|---|---|---|---|---|---|
| ID | minADE↓ | minFDE↓ | MR↓ | IoU-f.↑ | IoU-f.↑ | VPQ-n.↑ | VPQ-f.↑ | avg.L2↓ | avg.Col.↓ |
| 0* | 0.858 | 1.270 | 0.186 | 55.9 | 34.6 | 47.8 | 26.4 | 1.154 | 0.941 |
| 1 | — | — | — | — | — | — | — | — | — |
| 2 | — | — | — | — | — | — | — | — | — |
| 3 | — | — | — | — | — | — | — | — | — |
| 4 | 0.815 | 1.224 | 0.182 | — | — | — | — | — | — |
| 5 | 0.751 | 1.109 | 0.162 | — | — | — | — | — | — |
| 6 | 0.736(−9.7%) | 1.066(−12.9%) | 0.158 | — | — | — | — | — | — |
| 7 | — | — | — | 60.5 | 37.0 | 52.4 | 29.8 | — | — |
| 8 | — | — | — | 62.1 | 38.4 | 52.2 | 32.1 | — | — |
| 9 | 0.710 (−3.5%) | 1.005(−5.89%) | 0.146 | 62.3 | 39.4 | 53.1 | 32.2 | — | — |
| 10 | — | — | — | — | — | — | — | 1.131 | 0.773 |
| 11 | 0.741 | 1.077 | 0.157 | — | — | — | — | 1.014 | 0.717 |
| 12 | 0.728 | 1.054 | 0.154 | 62.3 | 39.5 | 52.8 | 32.3 | 1.004 | 0.430 |

Any process or method in the flowchart or otherwise described herein should be understood as representing a modules, segment or portion of code including one or more executable instructions for implementing steps of specific logical functions or processes, and the scope of preferred embodiments of the present application includes additional implementations, in which functions can be performed not in the order shown or discussed, including in a substantially simultaneous manner or in the reverse order, depending on the function involved, as should be understood by those skilled in the art to which embodiments of the present application belong.

It should be understood that portions of the present application can be implemented through hardware, software, firmware, or a combination thereof. In the above embodiments, a plurality of steps or methods can be implemented in software or firmware stored in a memory and executed by a suitable instruction execution system. For example, the steps or methods, if implemented through hardware, as in another embodiment, can be implemented through any one or a combination of the following technologies, which are well known in the art: a discrete logic circuit having a logic gate circuit for implementing a logic function on a data signal, a specific integrated circuit having an appropriate combinational logic gate circuit, a programmable gate array (PGA), a field programmable gate array (FPGA), and the like.

hardware by means of a program. The program can be stored in a computer-readable storage medium, and the program, when executed, can implement one or a combination of the steps of the method embodiments.

In addition, the functional units in the embodiments of the present application can be integrated into one processing module, or each unit can exist physically alone, or two or more units can be integrated in one module. The integrated modules described above can be implemented in the form of hardware or software functional modules. The integrated module can be stored in a computer-readable storage medium if it is implemented in the form of a software functional module and sold or used as a separate product.

The storage medium described above may be a read-only memory, a magnetic or optical disk, etc.

In the description of the specification, the reference term "one embodiment", "some embodiments", "an example", "a specific example", "some examples" or the like means that a particular feature, structure, material, or characteristic described in connection with the embodiment or example is included in at least one embodiment or example of the present application. In the specification, the schematic representations of the terms used above do not necessarily refer to the same embodiment or example. In addition, the particular features, structures, materials, or characteristics described may be combined in any suitable manner in any one or more of embodiments or examples.

Although the embodiments of the present application have been shown and described above, it can be understood that the above embodiments are exemplary and should not be construed as limiting the present application. It is to be understood by those skilled in the art that variations, modifications, substitutions and alterations can be made to the above embodiments within the scope of the present application without departing from the spirit and scope of the present application. The scope of the present application is defined by the appended claims and equivalents thereof.

What is claimed is:

1. A full-stack autonomous driving planning method, comprising the following steps:

acquiring an image of a scene through a photographing unit, converting the image into an image feature through an image feature extractor, and converting the image feature into a bird's-eye view feature map through a bird's-eye view encoder;

detecting a plurality of agents from the bird's-eye view feature map through a group of track query vectors, and continuously tracking the plurality of agents, wherein the group of track query vectors are introduced to model an entire life cycle of the plurality of agents in a scene, wherein the entire life cycle is a whole process from appearance to complete disappearance;

segmenting different types of map elements from the bird's-eye view feature map through a group of map query vectors, and continuously updating the map elements;

predicting a future trajectory of each agent using an interaction between the plurality of agents and the different map elements, wherein the future trajectory of each agent is predicted by modeling the interaction between the plurality of agents and environment;

updating, according to the predicted future trajectory of each agent, a future bird's-eye view feature map through a multi-head attention mechanism which introduces motion information of objects by taking the bird's-eye view feature map as query vectors so as to predict an occupancy grid map over multi-steps into the future, wherein the occupancy grid map refers to a representation of a discretized bird's-eye view feature map with a value of each occupancy grid representing whether the occupancy grid is occupied by the agent; and decoding an ego-vehicle query vector to generate a planned path of an ego-vehicle, and optimizing the planned path of the ego-vehicle by using the predicted future multi-step occupancy grid map, wherein the ego-vehicle query vector represents a modeling of an ego-vehicle motion state.

2. The full-stack autonomous driving planning method according to claim 1, wherein keys and values of the track query vectors are the bird's-eye view feature map;

continuously tracking the plurality of agents comprises:
updating the key and the value of each track query vector through a multi-head cross-attention mechanism.

3. The full-stack autonomous driving planning method according to claim 1, wherein keys and values of the map query vectors are the bird's-eye view feature map;

continuously updating the map elements comprises:
updating the key and the value of each map query vector through a multi-head cross-attention mechanism.

4. The full-stack autonomous driving planning method according to claim 1, wherein the map elements comprise: lane lines and pedestrian lines.

5. A unified framework system for full-stack autonomous driving planning, comprising:

an acquisition module, configured for acquiring an image of a scene, converting the image into an image feature through an image feature extractor, and converting the image feature into a bird's-eye view feature map through a bird's-eye view encoder;

a tracking module, configured for detecting a plurality of agents from the bird's-eye view feature map through a group of track query vectors, and continuously tracking the plurality of agents, wherein the group of track query vectors are introduced to model an entire life cycle of the plurality of agents in a scene, wherein the entire life cycle is a whole process from appearance to complete disappearance;

a map module, configured for segmenting different types of map elements from the bird's-eye view feature map through a group of map query vectors, and continuously updating the map elements;

a motion forecasting module, configured for forecasting a future trajectory of each agent using an interaction between the plurality of agents and the different map elements, wherein the future trajectory of each agent is predicted by modeling the interaction between the plurality of agents and environment;

an occupancy prediction module, configured for updating, according to the predicted future trajectory of each agent, a future bird's-eye view feature map through a multi-head attention mechanism which introduces motion information of objects by taking the bird's-eye view feature map as query vectors so as to predict an occupancy grid map over multi-steps into the future, wherein the occupancy grid map refers to a representation of a discretized bird's-eye view feature map with a value of each occupancy grid representing whether the occupancy grid is occupied by the agent; and a planning module, configured for decoding an ego-vehicle query vector to generate a planned path of an ego-vehicle, and optimizing the planned path of the ego-vehicle by using the predicted future multi-step occupancy grid map, wherein the ego-vehicle query vector represents a modeling of an ego-vehicle motion state.

6. The unified framework system according to claim 5, wherein keys and values of the track query vectors are the bird's-eye view feature map;

continuously tracking the plurality of agents comprises:
updating the key and the value of each track query vector through a multi-head cross-attention mechanism.

7. The unified framework system according to claim 5, wherein keys and values of the map query vectors are the bird's-eye view feature map;

continuously updating the map elements comprises:
updating the key and the value of each map query vector through a multi-head cross-attention mechanism.

8. The unified framework system according to claim 5, wherein the map elements comprise: lane lines and pedestrian lines.

9. The full-stack autonomous driving planning method according to claim 1, wherein the interaction comprises interactions present between an agent and an agent, an agent and a map, and an agent and a trajectory end point respectively, and are represented as follows:

$$Q_{a/m} = MHCA(MHSA(Q), Q_A / Q_M),$$

$$Q_g = DeformAttn(Q, \hat{x}_T^{l-1}, B),$$

where MHCA represents multi-head cross-attention, MHSA represents multi-head self-attention, DeformAttn represents deformable attention, Q represents a trajectory query vector, $Q_A$ represents an agent feature from the tracking module, $Q_M$ represents a map feature from the map module, $Q_{a/m}$ represents a trajectory feature after the interaction between track query vectors Q, $Q_A$ and $Q_M$, B represents a bird's-eye view feature map, $\hat{x}_T^{l-1}$ represents an output of the previous layer of motion forecasting module, and $Q_g$ represents a trajectory feature after the interaction between the trajectory query vector Q and the trajectory end point.

10. The full-stack autonomous driving planning method according to claim 1, wherein an introduction of motion information of objects by multi-head attention mechanism comprises representing dense grids in the scene as query vectors Q, and representing object features as keys K and values V, wherein the query vectors are updated multiple times through multi-layer decoders and are defined to represent a future timing.

\*  \*  \*  \*  \*